UNITED STATES PATENT OFFICE.

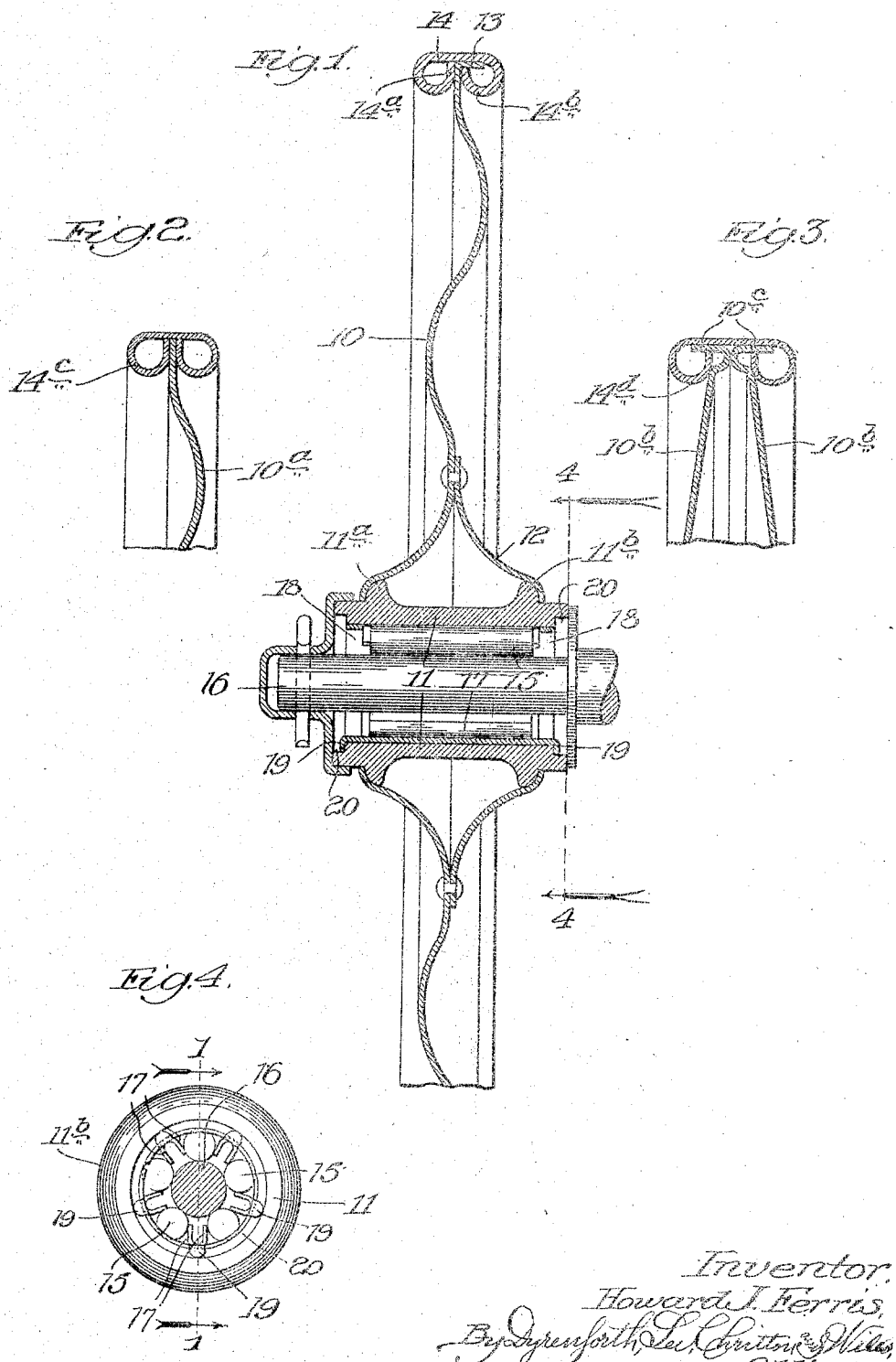

HOWARD J. FERRIS, OF HARVARD, ILLINOIS, ASSIGNOR TO HUNT, HELM, FERRIS & COMPANY, OF HARVARD, ILLINOIS, A CORPORATION OF ILLINOIS.

SOLID WHEEL AND TIRE.

1,341,308.

Specification of Letters Patent.

Patented May 25, 1920.

Application filed November 3, 1919. Serial No. 335,317.

*To all whom it may concern:*

Be it known that I, HOWARD J. FERRIS, a citizen of the United States, residing at Harvard, in the county of McHenry and State of Illinois, have invented a new and useful Improvement in Solid Wheels and Tires, of which the following is a specification.

My invention relates to wheels, and is particularly adapted for use on toy express wagons and the like. It is fully described in the following specification and shown in the drawings in which, Figure 1 is a transverse axial section through a wheel showing one form of my invention;

Figs. 2 and 3 are partial similar radial sections showing other forms of web and tire construction; and Fig. 4 is an end elevation of the bearing taken on the line 4—4 of Fig. 1.

In Fig. 1 I have illustrated a preferred embodiment of my wheel, in which the web 10 is pressed so as to seat upon a shoulder 11$^a$ of a hub 11. A corresponding collar 12 is riveted to the web 10 and bears upon the shoulder 11$^b$ to securely position the web upon the hub.

The web is preferably given a series of concentric corrugations to increase its stiffness. The outer edge is also preferably turned so as to form a flange 13 as in Fig. 1. A tire 14 is formed by rolling in the edges of a metallic strip so as to form inwardly facing portions or beads 14$^a$ and 14$^b$, which grip the outer flat portion of the web between them. The flange 13 also lies within the bead 14$^b$.

The hub 11 is bored out to receive rollers 15 which surround and turn on the axle 16. A cage for the rollers is provided which is preferably made from sheet metal by striking up longitudinal members to form U-shaped ribs 17 which run longitudinally between the rollers. Continuous metal rings 18 are left at the ends, and ears 19 are turned up from these rings and loosely engage the shoulder 20 formed in each end of the hub 11. The cage is thus permitted to turn with the rollers.

In Fig. 2 I have shown a modification of the edge of the web and tire. This web 10$^a$ ends in a plane disk and has a tire having two similar inturned beads 14$^c$.

In Fig. 3 I have shown still another modification in which the wheel has two webs 10$^b$ having flanges 10$^c$ which are retained by the inturned beads 14$^d$ of the tire.

In many cases it is preferable to have the tire 14 of heavier material than the web 10 as shown in Fig. 1.

While I have shown but a few embodiments of my invention it will be understood that numerous modifications are possible. Changes therefore in the construction and arrangement may be made which do not depart from the spirit and scope of the appended claims in which it is my intention to claim all the novelty inherent in my invention as broadly as possible in view of the prior art.

What I claim as new and desire to secure by Letters Patent is:

1. In a wheel, a continuous web having a portion near the outer edge lying in a radial plane and a tire having inwardly turned portions which engage the web on opposite sides of said portion.

2. In a wheel, a continuous web having an outer flange substantially at right angles to the radial plane of the wheel and a tire having inwardly turned portions which engage the web on opposite sides thereof.

3. In a wheel, a continuous web having an outer flange substantially at right angles to the radial plane of the wheel, a tire having inwardly turned portions which engage the web on opposite sides thereof and having a cylindrical ground engaging portion adjoining said flange.

4. In a wheel, a continuous web having an outer flange substantially at right angles to the radial plane of the wheel, a tire having inwardly turned portions which engage the web on opposite sides thereof, and a cylindrical ground engaging portion adjoining said flange, one of said inwardly turned portions partially surrounding said flange.

5. In a wheel, a hub, a tire and a member connecting said hub and tire, said member having a flanged outer edge and said tire having inwardly turned edges engaging said member, one of said edges partially surrounding said flanged outer edge.

6. In a wheel, a continuous web and a tire having inwardly turned portions which engage the web on opposite sides thereof, said web and tire being formed of sheet metal, the metal forming the tire being of heavier gage than that forming the web.

7. In a wheel, a continuous web having a portion near the outer edge lying in a radial plane and a tire having inwardly turned portions which engage the web on opposite sides of said portion, said web and tire being formed of sheet metal, the metal forming the tire being of heavier gage than that forming the web.

8. In a wheel, a hub, a tire and a web connecting the hub and tire, said web having an outer circular portion lying in a plane, said tire having inwardly turned edges forming beads, the outer surfaces of which are turned toward each other and lie on opposite sides of said web.

9. In a wheel, a hub, a tire and a web connecting the hub and tire, said web having an outer circular portion lying in a plane, said tire having inwardly turned edges forming beads, the outer surfaces of which are turned toward each other and lie on opposite sides of said web, said surfaces being held firmly thereto.

HOWARD J. FERRIS.